United States Patent [19]

Gempe et al.

[11] Patent Number: 5,393,989
[45] Date of Patent: Feb. 28, 1995

[54] SELF BIASED ELECTRICALLY ISOLATED REMOTE SWITCH POWERED BY AN OPTICAL OR ACOUSTIC COUPLING

[75] Inventors: Horst A. Gempe; John E. Salina, both of Phoenix, Ariz.

[73] Assignee: Motorola, Inc., Schaumburg, Ill.

[21] Appl. No.: 100,397

[22] Filed: Aug. 2, 1993

[51] Int. Cl.[6] .............................................. G02B 27/00
[52] U.S. Cl. ...................................... 250/551; 327/514
[58] Field of Search ............................ 250/551, 227.21; 367/157; 359/142, 143, 147; 307/311

[56] References Cited

U.S. PATENT DOCUMENTS

| | | | |
|---|---|---|---|
| 4,058,735 | 11/1977 | Tippner | 250/551 |
| 4,129,785 | 12/1978 | Kadah | 250/551 |
| 4,529,904 | 7/1985 | Hattersley | 310/318 |
| 4,977,329 | 12/1990 | Eckhardt et al. | 250/551 |
| 5,134,282 | 7/1992 | Sargoytcher | 250/227.21 |

Primary Examiner—David C. Nelms
Assistant Examiner—Steven L. Nichols
Attorney, Agent, or Firm—Gary W. Hoshizaki

[57] ABSTRACT

A self biased isolated remote switch (11) for electrically isolating a switch (24) from a circuit (16). The circuit (16) is coupled to the primary side of the self biased isolated remote switch (11) while the switch is coupled to the secondary side. The secondary side does not need a power source, power is provided through non-electrical coupling from the primary side. The self biased isolated remote switch (11) comprises a first circuit (13) and a second circuit (14) both on the primary side, and a third circuit (12) on the secondary side. The first circuit (13) non-electrically couples to the third circuit (12) for providing power. The third circuit (12) non-electrically couples to the second circuit (14) for indicating when the switch (24) is closed.

20 Claims, 2 Drawing Sheets

SELF BIASED ELECTRICALLY ISOLATED REMOTE SWITCH POWERED BY AN OPTICAL OR ACOUSTIC COUPLING

BACKGROUND OF THE INVENTION

This invention relates, in general, to isolator circuits, and more particularly to isolators for coupling a circuit to a switch.

In general, an isolator is used to electrically isolate one circuit from another. A common form of isolator is an optical coupler (opto-coupler). The optical coupler typically has a light emitting diode (LED) for emitting light to a detector diode which senses the emitted light and provides a current signal. The light emitting diode optically couples to the detector diode. For example, a control circuit operating at a low voltage is coupled to the secondary side of the opto-coupler where the light emitting diode resides. The control circuit enables a primary side circuit (operating at hazardous voltages) coupled to the primary side of the opto-coupler where the detector diode resides. This allows the primary side circuit to be controlled through the opto-coupler without the control circuit being exposed to the hazardous voltage.

In the example described above, both the control circuit and the primary side circuit are powered by their own independent power supplies. Power must be supplied to the light emitting diode of the opto-coupler. There are cases, such as remote switching when a power supply to the secondary side of the isolator is not available or convenient. Isolated remote switching is simply a switch isolated from a circuit through an isolator. It would be of great benefit if an isolator could be provided that need not be powered on the secondary side of the isolator but is electrically isolated from the circuit.

SUMMARY OF THE INVENTION

Briefly stated, this invention is a self biased isolated remote switch having a primary side electrically decoupled from a secondary side. The secondary side is powered by the primary side thereby eliminating the need for a power source to the secondary side.

The self biased switch comprises a first circuit on the secondary side, a second circuit on the primary side, and a third circuit on the primary side. The first circuit has a first terminal and a second terminal for coupling to a switch. The switch when closed non-electrically couples the secondary side of the self biased isolated remote switch to the primary side.

The second circuit is responsive to a bias voltage and non-electrically couples to the first circuit for providing power to the secondary side. The first circuit non-electrically couples to the third circuit for providing a signal when the switch is closed. The third circuit provides an electrical signal on the primary side corresponding to the closure of the switch.

DETAILED DESCRIPTION OF THE DRAWINGS

Figure 1:
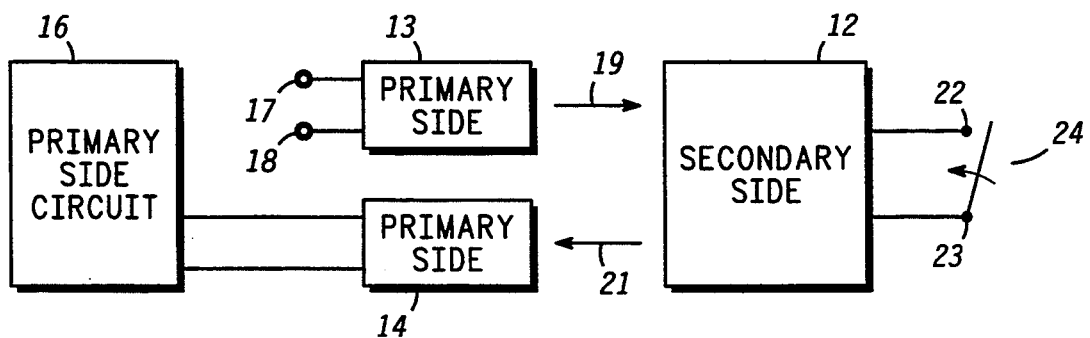
FIG. 1 is a block diagram of a self biased isolated remote switch in accordance with the present invention.

FIG. 1 is a block diagram of a self biased isolated remote switch 11 in accordance with the present invention. The self biased isolated remote switch 11 has a primary side that is electrically isolated from a secondary side. The secondary side of self biased isolated remote switch 11 has a circuit 12. The primary side of self biased isolated remote switch 11 has a circuit 13 and a circuit 14.

In general, there are many applications where it is necessary to place a switch remotely for operating a circuit. One situation that necessitates an isolated switch is when a circuit operates at high voltages that could be hazardous to human life. Coupling high voltage wires to the switch may be costly, dangerous, and unreliable. A common solution is to couple the switch non-electrically to the circuit. For example, an optical coupler, well known in the electrical arts, will isolate the switch from the circuit. The optical coupler has a primary side that includes a detector diode coupled to the circuit and a secondary side that includes a light emitting diode coupled to the switch. When the switch is closed the light emitting diode emits light that is received by the detector diode which generates a current signal that is utilized by the circuit. The problem resides in the fact that it may not be convenient to provide power to the secondary side. In this example, a power supply would be necessary for powering the light emitting diode. Self biased isolated remote switch 11 not only electrically isolates the primary side from the secondary side but does not need a power supply for the secondary side. Power to the secondary side is received from the primary side through a non-electrical coupling.

A switch 24 is coupled to a primary side circuit 16 through self biased isolated remote switch 11. Circuit 13 on the primary side includes inputs 17 and 18 for receiving a bias voltage. In the preferred embodiment, the bias voltage is provided by primary side circuit 16. Circuit 13 (primary side) non-electrically couples to circuit 12 (secondary side) as indicated by arrow 19 for providing energy to power circuit 12. Circuit 12 has a terminal 22 and a terminal 23 coupled to switch 24. In the preferred embodiment, circuit 12 is not enabled until switch 24 is closed. When switch 24 is closed circuit 12 non-electrically couples to circuit 14 (primary side) as indicated by arrow 21. Circuit 14 is coupled to primary side circuit 16. The non-electrical signal provided by circuit 12 to circuit 14 is converted back into an electrical signal by circuit 14 which is received by primary side circuit 16.

Figure 2:
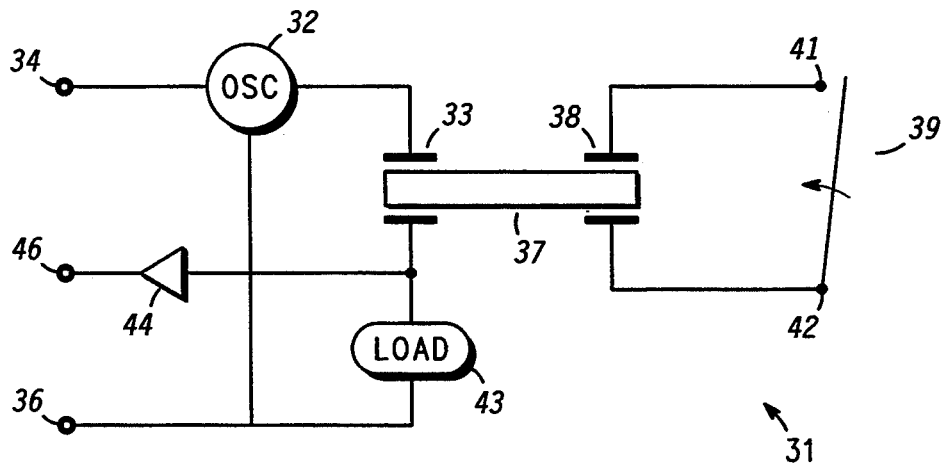
FIG. 2 is a schematic of an embodiment of a self biased isolated remote switch in accordance with the present invention.

FIG. 2 is a schematic diagram of an embodiment of a self biased isolated remote switch 31 corresponding to the block diagram of FIG. 1. Self biased isolated remote switch 31 has a primary side and a secondary side that are acoustically coupled to one another. In the preferred embodiment, self biased isolated remote switch 31 utilizes piezo-electric devices for converting an electrical signal to an acoustical signal and vice versa.

An oscillator 32 and a piezo-electric transducer 33 both on the primary side of self biased isolated remote switch 31 correspond to circuit 13 of FIG. 1. Oscillator 32 has a terminal 34 and a terminal 36 for receiving a bias voltage. The bias voltage enables oscillator 32 to provide a signal of a predetermined frequency. Piezo-electric transducer 33 receives the signal provided by oscillator 32. Piezo-electric transducer 33 generates a mechanical vibration that is transmitted through an acoustic medium 37 to a piezo-electric transducer 38 on the secondary side of self biased isolated remote switch 31. The mechanical vibration non-electrically provides power to piezo-electric transducer 38. Piezo-electric transducer 38 corresponds to circuit 12 of FIG. 1. Piezo-electric transducer 38 includes terminals 41 and 42 that are coupled to a switch 39. Acoustic medium 37 non-electrically couples the primary side to the secondary side. Acoustic medium 37 can be made of any non-conductive low loss material for transmitting the mechanical vibration, for example, a ceramic, plastic, or rubber compound. A load 43 couples between piezo-electric transducer 33 and terminal 36. In the preferred embodiment, load 43 is a resistor. An amplifier 44 is coupled to load 43 to amplify a signal generated therewith. An output of amplifier 44 is coupled to a terminal 46. A signal generated across terminals 46 and 36 is coupled to a circuit (not shown) on the primary side. The circuit coupled to terminals 46 and 36 corresponds to primary side circuit 16 of FIG. 1.

Operation of self biased isolated remote switch 31 is determined by the characteristics of piezo-electric transducers 33 and 38, in concert with acoustic medium 37. It is well known that piezo-electric devices are used for filtering applications. The precise frequencies at which filtering occurs and the type of filter response (bandpass, high pass, low pass, etc.) is determined by the physical dimensions of the piezo-electric filter and the filter material characteristics. It should be noted that piezo-electric transducers 33 and 38, and acoustic medium 37 are also designed (by adjusting physical characteristics) to produce the results described herein. In the preferred embodiment, piezo-electric transducers 33 and 38 operate at approximately their resonant frequencies to maximize energy transfer.

Self biased isolated remote switch 31 has two modes of operation, first when switch 39 is open and second when switch 39 is closed. In the first mode when switch 39 is open, oscillator 32 is enabled by the bias voltage applied across terminals 34 and 36. The bias voltage can be applied from the circuit (not shown) on the primary side of self biased isolated remote switch 31 or from an external source such as a power supply or battery. Oscillator 32 generates an electric signal of a predetermined frequency that is converted to a mechanical vibration by piezo-electric transducer 33 and transmitted through acoustic medium 37 to piezo-electric transducer 38. Self biased isolated remote switch 31 can be modeled as a delay line or transmission line for the mechanical vibration. In the preferred embodiment, switch 39 being open causes some reflection of the mechanical vibration from piezo-electric transducer 38 back to piezo-electric transducer 33. Under this condition oscillator 32 is lightly loaded and current flowing through load 43 generates a voltage signal of a small amplitude.

In the second mode when switch 39 is closed, oscillator 32 generates the electric signal of the predetermined frequency that is converted to the mechanical vibration by piezo-electric transducer 33. The mechanical vibration is received by piezo-electric transducer 38 which converts the mechanical vibration to an electrical signal within the closed loop created when switch 39 is closed. In the preferred embodiment, the closed loop causes reflections or feedback of the mechanical vibration to be sent back through acoustic medium 37 to piezo-electric transducer 33. The phase of the reflections are such that current to load 43 is increased causing a voltage signal of a higher magnitude than the first mode of operation. Amplifier 44 amplifies the voltage signal across load 43. A threshold voltage can be set for amplifier 44 greater than the voltage signal generated in the first mode of operation that will allow only the voltage signal generated in the second mode to be amplified.

Figure 3:
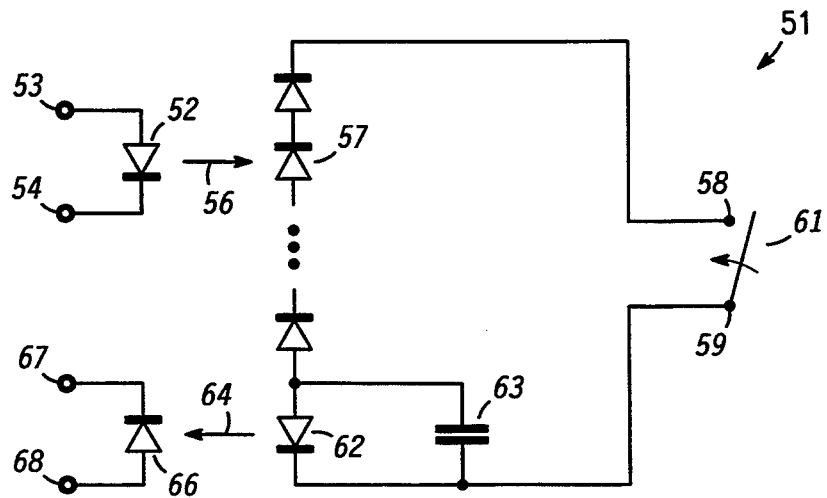
FIG. 3 is a schematic of an embodiment of a self biased isolated remote switch in accordance with the present invention.

FIG. 3 is a schematic diagram of an embodiment of a self biased isolated remote switch 51 corresponding to the block diagram of FIG. 1. Self biased isolated remote switch 51 has a primary side and a secondary side that are optically coupled to one another. In the preferred embodiment, self biased isolated remote switch 51 utilizes optical devices such as light emitting diodes (LEDs) and detector diodes for converting an electrical signal to an optical signal and vice versa.

A light emitting diode 52 on the primary side of self biased isolated remote switch 51 corresponds to circuit 13 of FIG. 1. Light emitting diode 52 has a terminal 53 and a terminal 54 for receiving a bias voltage. The bias voltage enables light emitting diode 52 for emitting light as indicated by arrow 56. An array of detector diodes 57 on the second side receives the light emitted by light emitting diode 52. The light emitted by light emitting diode 52 non-electrically provides power to circuit by on the secondary side of self biased isolated remote switch 51. In the preferred embodiment, array of detector diodes 57 are serially coupled having one end coupled to a terminal 58 and another end coupled to a light emitting diode 62 and a capacitor 63. Array of detector diodes 57, light emitting diode 62, and capacitor 63 corresponds to circuit 12 of FIG. 1. Light emitting diode 62 and capacitor 63 are parallel to one another and are also coupled to a terminal 59. A switch 61 couples across terminals 58 and 59. Light emitted from light emitting diode 62, indicated by arrow 64, non-electrically couples to a detector diode 66 on the primary side when switch 61 is closed. Detector diode corresponds to circuit 14 of FIG. 1. Detector diode 66 is coupled to a terminal 67 and a terminal 68. Terminals 67 and 68 couple to circuit (not shown) on the primary side of self biased isolated remote switch 51. The circuit coupled to terminals 67 and 68 correspond to primary side circuit 16 of FIG. 1.

Operation of self biased isolated remote switch 51 includes a first mode of operation when switch 61 is open and a second mode of operation when switch 61 is closed. Array of detector diodes 57, light emitting diode 62, and capacitor 63 are disabled when switch 61 is open. No light is emitted by light emitting diode 62 under this condition.

In the second mode of operation, switch 61 is closed, array of detector diodes 57, light emitting diode 62, and capacitor 63 are enabled for coupling switch 61 to the circuit (not shown) on the primary side. The bias voltage applied to light emitting diode 52 causes light to be emitted for reception by array of detector diodes 57. Array of detector diodes 57 converts the light received to a current for charging capacitor 63. The number of detector diodes in array of detector diodes 57, the flux emitted by light emitting diode 52, and the coupling factor from light emitting diode 52 to array of detector diodes 57 are all factors in determining the magnitude of the current provided by array of detector diodes 57. Capacitor 63 stores charge for powering light emitting diode 62. In the preferred embodiment, light emitting diode 62 is a four layer light emitting diode. The four layer light emitting diode will not be enabled for emitting light until the voltage on capacitor 63 is above a predetermined threshold voltage. The predetermined threshold voltage of the four layer light emitting diode is significantly higher than a forward voltage diode drop of a standard light emitting diode. This allows enough charge to be stored on capacitor 63 to bias light emitting diode 62 to emit light of sufficient flux that is easily sensed by detector diode 66. Detector diode 66 generates an electrical signal from light received from light emitting diode 62 that is used by the circuit coupled to terminals 67 and 68. If switch 61 remains closed, a sequence will develop that comprises charging capacitor 63 with current from array of detector diodes 57 and rapidly discharging capacitor 63 through light emitting diode 62.

Figure 4:
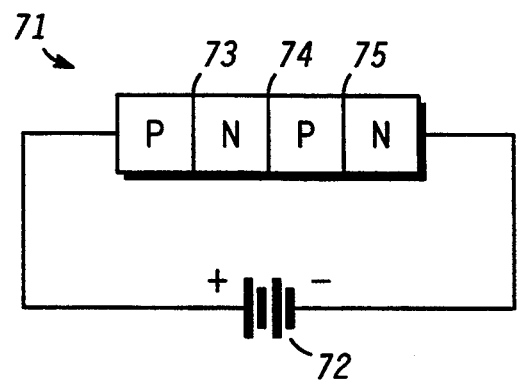
FIG. 4 is an illustration of a four layer light emitting diode.

FIG. 4 is a diagram of a four layer light emitting diode 71 biased by a voltage source 72. Four layer light emitting diode 71 has a junction 73, a junction 74, and a junction 75. Four layer light emitting diode 71 will not emit light until a predetermined threshold voltage is exceeded. A positive voltage bias applied across four layer light emitting diode 71 will cause junctions 73 and 75 to be forward biased and junction 74 to be reverse biased. Junction 74 (reverse biased) presents a high impedance current path through four layer light emitting diode 71 that restricts current flow. As the positive voltage bias is increased the electric field across junction 74 will increase until avalanche breakdown occurs. The avalanche breakdown coincides with the predetermined threshold voltage of four layer light emitting diode 71. Once avalanche breakdown occurs, the voltage drop across four layer light emitting diode 71 decreases rapidly as the current flow increases. This is a negative resistance region. Light is then emitted from four layer light emitting diode 71 after collapsing to a voltage minimum due to the increased current flow.

Figure 5:
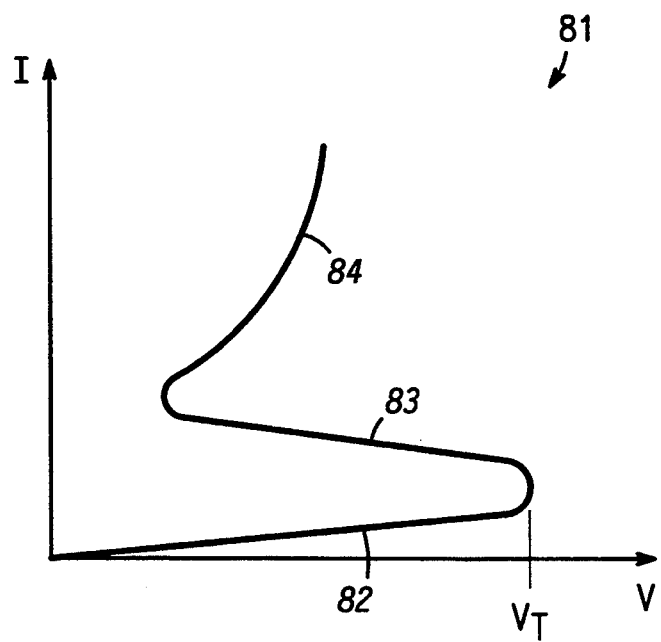
FIG. 5 is a voltage versus current graph of the four layer light emitting diode illustrated in FIG. 4.

FIG. 5 is a voltage versus current graph 81 of four layer light emitting diode 71 illustrated in FIG. 4. Voltage versus current graph 81 shows three regions of operation of four layer light emitting diode 71 when forward biased. Region 82 occurs when junctions 73 and 75 (FIG. 4) are forward biased, and junction 74 (FIG. 4) is reverse biased. Very little current flows through four layer light emitting diode 71 in region 82 until the voltage exceeds $V_T$ (threshold voltage). $V_T$ corresponds to the predetermined threshold voltage at which light emitting diode 62 (FIG. 3) is enabled. Above $V_T$ four layer light emitting diode 71 is in region 83 which is a region of negative resistance. Junction 74 is in avalanche breakdown in region 83. Region 83 transitions to region 84 which is a light emitting region. Note that a significant amount of current flows through four layer light emitting diode 71 in region 84 and its characteristic curve is similar to that of a forward biased diode.

By now it should be appreciated that a self biased isolated remote switch has been provided. A switch is electrically isolated from a circuit. The circuit couples to the self biased isolated remote switch primary side while the switch couples to the secondary side. No power is needed on the secondary side of the switch, power is non-electrically provided to the secondary side from the primary side.

We claim:

1. A self biased isolated remote switch having a primary side electrically decoupled from a secondary side, the self biased isolated remote switch comprising:

a first circuit on the secondary side including first terminal and a second terminal, said first circuit being non-electrically coupled to a second circuit and a third circuit on the primary side of the self biased isolated remote switch, said first circuit providing a signal to said third circuit;

said second circuit responsive to a bias voltage for providing energy to power said first circuit; and said third circuit for converting said signal provided by said first circuit to an electrical signal.

2. A self biased isolated remote switch as recited in claim 1 wherein a switch couples between said first and second terminals of said first circuit and wherein said signal provided by said first circuit to said third circuit occurs when said switch is closed.

3. A self biased isolated remote switch as recited in claim 1 wherein said first circuit is coupled to said second and third circuits optically.

4. A self biased isolated remote switch as recited in claim 1 wherein said first circuit is coupled to said second and third circuits acoustically.

5. A self biased isolated remote switch as recited in claim 1 wherein said second circuit includes a light emitting diode for transmitting light, wherein said first circuit includes an array of detector diodes for receiving said transmitted light from said light emitting diode of said second circuit, a capacitor coupled to said array of detector diodes for storing charge received therefrom for powering said first circuit, and a light emitting diode coupled in parallel with said capacitor for emitting light.

6. A self biased isolated remote switch as recited in claim 5 wherein said light emitting diode is a four layer light emitting diode for emitting light when said capacitor charges to a predetermined threshold voltage.

7. A self biased isolated remote switch as recited in claim 5 wherein said third circuit includes a detector diode for receiving light emitted by said light emitting diode of said first circuit.

8. A self biased isolated remote switch as recited in claim 1 wherein said second circuit includes an oscillator and a piezo-electric transducer, said piezo-electric transducer being responsive to a signal provided by said oscillator for providing a mechanical vibration.

9. A self biased isolated remote switch as recited in claim 8 wherein an acoustic medium is responsive to said mechanical vibration provided by said piezo-electric transducer of said second circuit, said acoustic medium transferring said mechanical vibration and electrically isolating the primary side from the secondary side of the self biased isolated remote switch.

10. A self biased isolated remote switch as recited in claim 9 wherein said first circuit includes a piezo-electric transducer responsive to said mechanical vibration transferred through said acoustic medium.

11. A self biased isolated remote switch as recited in claim 10 wherein said third circuit includes a load responsive to a signal provided by said piezo-electric device of said second circuit.

12. A self biased isolated remote switch as recited in claim 11 wherein said third circuit includes an amplifier coupled to said load.

13. An optical self biased isolated remote switch having a primary side electrically decoupled from a secondary side, the self biased isolated remote switch comprising:
   a first light emitting diode on the primary side responsive to a bias voltage;
   an array of detector diodes on the secondary side responsive to light emitted by said first light emitting diode for providing a current;
   a capacitor on the secondary side responsive to said current provided by said detector diodes, said capacitor storing charge;
   a second light emitting diode on the secondary side responsive to a voltage across said capacitor; and
   a detector diode on the primary side responsive to light emitted by said second light emitting diode for providing an electrical signal.

14. An optical self biased isolated remote switch as recited in claim 13 wherein a closed switch on the secondary side enables said array of detector diodes.

15. An optical self biased isolated remote switch as recited in claim 13 wherein said second light emitting diode emits light when said capacitor charges to a predetermined threshold voltage.

16. An optical self biased isolated remote switch as recited in claim 13 Wherein said second light emitting diode is a four layer light emitting diode.

17. An acoustical self biased isolated remote switch having a primary side electrically decoupled from a secondary side, the self biased isolated remote switch comprising:
   an oscillator on the primary side responsive to a bias voltage;
   a first piezo-electric transducer on the primary side responsive to a signal provided by said oscillator, said first piezo-electric transducer generating a mechanical vibration;
   an acoustic medium for acoustically coupling the primary side to the secondary side, said acoustic medium being responsive to said mechanical vibration provided by said first piezo-electric transducer;
   a second piezo-electric transducer on the secondary side responsive to said mechanical vibration transmitted through said acoustic medium, said second piezo-electric transducer providing acoustical feedback; and
   a load on the primary side responsive to said acoustical feedback from said second piezo-electric transducer for generating a voltage signal.

18. An acoustical self biased isolated remote switch as recited in claim 17 wherein a closed switch on said secondary side causes a portion of said mechanical vibration received by said second piezo-electric transducer to be reflected back to said first piezo-electric transducer.

19. An acoustical self biased isolated remote switch as recited in claim 17 wherein said oscillator operates at a predetermined frequency and wherein said predetermined frequency is a resonant frequency of said first and second piezo-electric transducer.

20. An acoustical self biased isolated remote switch as recited in claim 17 further including an amplifier responsive to said voltage signal across said load.

* * * * *